UNITED STATES PATENT OFFICE.

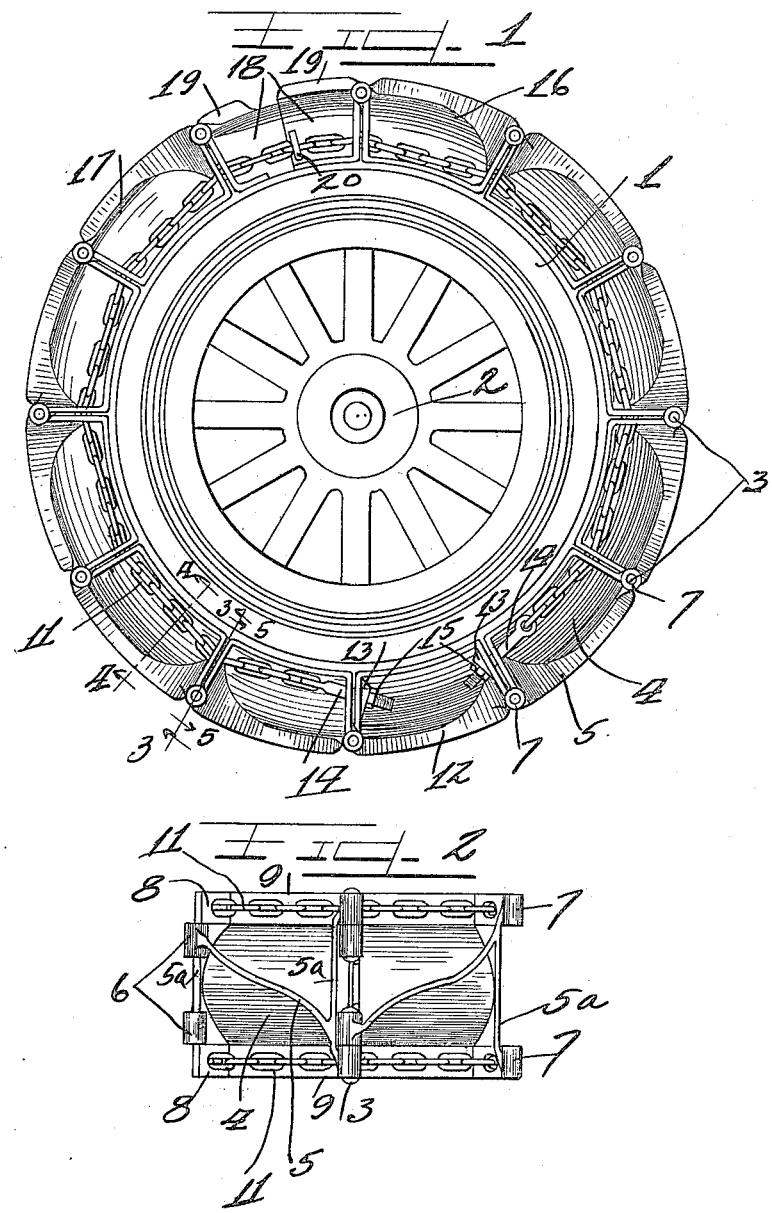

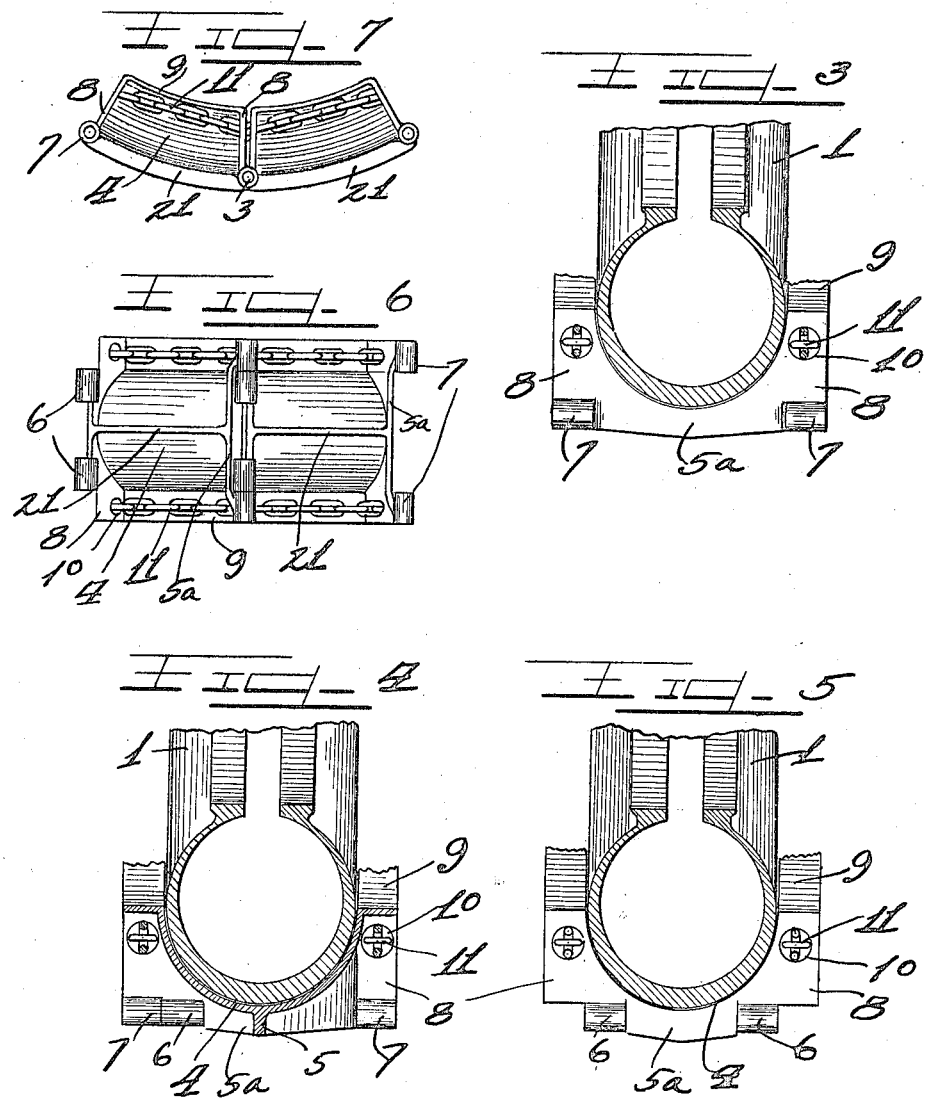

ALBERT EUGENE COOK, OF EVANSTON, AND THOMAS VAN TUYL, OF KANKAKEE, ILLINOIS; SAID VAN TUYL ASSIGNOR TO SAID COOK.

TRACTOR-TREAD FOR PNEUMATIC-TIRE WHEELS.

1,386,843.

Specification of Letters Patent.   Patented Aug. 9, 1921.

Application filed May 14, 1920. Serial No. 381,347.

*To all whom it may concern:*

Be it known that we, ALBERT E. COOK and THOMAS VAN TUYL, citizens of the United States, and residents of the city of Evanston, in the county of Cook and State of Illinois, and the city of Kankakee, in the county of Kankakee and State of Illinois, respectively, have invented certain new and useful Improvements in Tractor-Treads for Pneumatic-Tire Wheels; and we do hereby declare that the following is a full, clear, and exact description of the same, reference being had to the accompanying drawings, and to the numerals of reference marked thereon, which form a part of this specification.

This invention relates more particularly to an improved type of pneumatic tire tractor tread or traction device adapted to be adjustably engaged on vehicle wheels to increase the traction thereof.

It is an object of this invention to provide a tractor tread adapted to be removably engaged on a pneumatic tire wheel.

Another object of the invention is to provide a tractor tread wherein a plurality of hingedly connected tread shoes are adjustably secured on the tire of a vehicle wheel by adjustable chains.

It is a further object of the invention to construct a tractor tread adapted to be secured on the pneumatic tire of a vehicle wheel by means of chains which pass through openings in pivotally connected tread links and through half link members which are adapted to be drawn toward one another as the adjusting chains are tightened.

It is furthermore an object of this invention to provide a tractor tread attachment adapted for use on a vehicle wheel and having a linked tread portion the ends of which are adapted to be drawn together by means of chains adjustably engaged on opposite sides of said tread portion.

It is an important object of this invention to provide a non-skid tractor tread device wherein the tread surfaces are designed to not only prevent skidding but are also adapted to increase the traction efficiency of the vehicle wheel to which the device is secured.

Other and further important objects of this invention will be apparent from the disclosures in the specification and drawings.

The invention (in a preferred form) is illustrated in the drawings and hereinafter more fully described.

On the drawings:

Figure 1 is a side elevation of a pneumatic tire wheel equipped with a tractor tread embodying the principles of this invention.

Fig. 2 is a developed plan view of two of the tread members of the tractor tread.

Fig. 3 is an enlarged section taken on line 3—3, of Fig. 1.

Fig. 4 is an enlarged section taken on line 4—4, of Fig. 1.

Fig. 5 is an enlarged section taken on line 5—5, of Fig. 1.

Fig. 6 is a developed plan view of two tread members of a modified form of the device.

Fig. 7 is a side elevation thereof.

As shown on the drawings:

The tractor tread of this invention is adapted to be secured in place on the pneumatic tire 1 of the vehicle wheel 2, as illustrated in Fig. 1. The tractor tread comprises a plurality of main tread members or shoes which are hingedly connected one to the other at their outer corners by bolts or riveted pins 3. Each tread shoe embraces a curved body or link 4, adapted to fit over the tire 1. The tread shoe body 4, is provided with a diagonal outwardly projecting curved rib or web 5, and transverse ribs or webs 5ª, adapted to increase the traction of the wheel to which the device is attached. Integrally formed at one end of the tread shoe body 4, are two spaced hinge sleeves 6, while integrally formed on the other end of the tread shoe body 4, are two spaced hinge sleeves 7, which are spaced farther apart than the hinge sleeves 6, to permit the hinge sleeves 6 of an adjacent tread shoe to fit therebetween and aline therewith to receive a hinge pin 3, as shown in Fig. 2. Each tread shoe body 4, is provided at each side thereof with end flanges 8, connected by a longitudinal side flange 9. The end flanges 8, are provided with openings or apertures 10 to receive adjusting chains 11, which engage through said openings 10. The middle tractor shoe 12, is provided with threaded bosses 13, on the end flanges 8, to adjustably receive the threaded bolts 14, attached to the ends of the chains 11. Nuts 15, are removably threaded onto the ends of the chain bolts 14, for tensioning said chains to hold the tractor tread in position.

The end tread shoes 16 and 17 have hingedly connected therewith spaced half tread shoes or links 18. The half tread shoes 18, are provided with tread ribs or webs 19, and with apertured lugs 20, through which the chains 11 project.

In the modified form of the device shown in Figs. 6 and 7, the construction of the tread shoes is substantially the same as that already described with the exception that the curved diagonal ribs or webs 5, are replaced by central longitudinal ribs or webs 21.

The operation is as follows:

The tractor tread of this invention is adaped to be removably secured on the pneumatic tire 1 of a vehicle wheel 2, and on account of the adjustable chains, the device may be readily used on tires of different sizes. The device is placed in position on the tire as shown in Fig. 1, with the half end shoes or links 18, spaced apart. The chains 11, are then engaged through the apertures of the lugs 20 and the end flanges 8 of the tractor shoes, and the chain bolts 14, are projected through the bosses 13 of the middle shoe 12. The nuts 15, are threaded onto the chain bolts thereby tensioning the chains 11, and drawing the ends of the device together to secure the tractor tread in position for use as shown in Fig. 1. The ribs 5 and 5ª formed on the tread shoes are adapted to engage the surface or grip the material over which the vehicle is traveling, thereby eliminating skidding and also increasing the traction efficiency of the vehicle wheels. The hinged connections between the tractor shoes permit the tractor treads to flex longitudinally but not transversely thereby tending to increase the traction of the vehicle wheels on which the improved tractor treads are secured.

We are aware that numerous details of construction may be varied through a wide range without departing from the principles of this invention, and we therefore do not purpose limiting the patent granted otherwise than necessitated by the scope of the appended claims.

We claim as our invention:

1. A tractor tread embracing a plurality of hinged main tread members, end tread members connected with the main tread members, chains engaged with said main tread members and with said end tread members, and adjusting means on one of said main tread members connected with the ends of said chains to tension said chains for securing the tractor tread in position.

2. In a device of the class described, a plurality of hingedly connected main tread members, apertured flanges formed thereon, end tread members connected with the end main tread members, an apertured lug formed on each of said end tread members, webs formed on said main tread members and on said end tread members, chains on opposite sides of said device engaged through the apertures in said flanges and lugs, thread bolts secured on the ends of said chains, and means engaged on said thread bolts adapted to be adjusted to tension said chains to secure the tread members in position.

In testimony whereof, we have hereunto subscribed our names in the presence of a subscribing witness.

ALBERT EUGENE COOK.
THOMAS VAN TUYL.

Witness:
EARL M. HARDINE.